US012650209B1

(12) United States Patent
Eck et al.

(10) Patent No.: US 12,650,209 B1

(45) Date of Patent: Jun. 9, 2026

(54) RECESSED LIGHTING DETECTOR

(71) Applicant: Microchip Technology Inc., Chandler, AZ (US)

(72) Inventors: Arthur B. Eck, Gilbert, AZ (US); Bomy Chen, Newark, CA (US); Patrick McFarland, Gilbert, AZ (US); Steve Nagel, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 19/229,755

(22) Filed: Jun. 5, 2025

Related U.S. Application Data

(60) Provisional application No. 63/770,240, filed on Mar. 11, 2025.

(51) Int. Cl.

| | |
|---|---|
| ***F21S 8/02*** | (2006.01) |
| ***F21V 23/04*** | (2006.01) |
| ***F21V 33/00*** | (2006.01) |
| *F21Y 115/10* | (2016.01) |

(52) U.S. Cl.

CPC .............. *F21S 8/026* (2013.01); *F21V 23/04* (2013.01); *F21V 33/0076* (2013.01); *F21Y 2115/10* (2016.08)

(58) Field of Classification Search

CPC ......... F21V 33/0076; F21S 8/02; F21S 8/022; F21S 8/024; F21S 8/026; F21S 8/028; F21Y 2115/10

See application file for complete search history.

(56) References Cited

U.S. PATENT DOCUMENTS

| | | | | |
|---|---|---|---|---|
| 7,467,881 | B2 * | 12/2008 | McMillen | F21V 33/0076 362/147 |
| 10,262,525 | B2 | 4/2019 | Carlin et al. | |
| 2014/0266747 | A1 * | 9/2014 | Prendergast | G08B 17/113 362/253 |

FOREIGN PATENT DOCUMENTS

| | | | | |
|---|---|---|---|---|
| WO | 2005/116519 A1 | | 12/2005 | F21S 4/00 |
| WO | WO-2023175575 A1 | * | 9/2023 | F21V 33/0076 |

OTHER PUBLICATIONS

International Search Report and Written Opinion, Application No. PCT/US2025/043095, 12 pages, Dec. 10, 2025.

* cited by examiner

*Primary Examiner* — Robert J May

(74) *Attorney, Agent, or Firm* — SLAYDEN GRUBERT BEARD PLLC

(57) ABSTRACT

An apparatus may have a light fixture including a housing and a light element located within the housing. The apparatus may also include a face plate coupled to the light fixture. The apparatus may further include a detector. The detector may be coupled to the housing at a location behind a back surface of the face plate.

20 Claims, 8 Drawing Sheets

RECESSED LIGHTING DETECTOR

PRIORITY

This application claims priority to commonly owned U.S. Provisional Patent Application No. 63/770,240 filed Mar. 11, 2025, the entire contents of which are hereby incorporated by reference for all purposes.

TECHNICAL FIELD

The present disclosure relates to monitoring systems and methods. Various examples of the teachings herein include systems and/or methods for including monitoring systems (for example, smoke detectors, carbon monoxide detectors, among others) with recessed lighting fixtures.

BACKGROUND

Currently available monitoring systems and sensors, for example, carbon monoxide and smoke detectors, have become a standard safety feature in residential and commercial buildings, playing a crucial role in early fire and carbon monoxide detection and prevention of loss of life and property damage. These devices are typically mounted on ceilings or walls to monitor the air for the presence of smoke particles and carbon monoxide, triggering an alarm when one or both are detected.

The installation of these monitoring systems is often regulated by building codes and safety standards, which specify requirements for their placement, interconnection, and power sources. Due to these building codes and regulations, most homes built in the last 40 years include monitoring systems, for example, smoke detectors, which are interconnected and mounted on the same kind of utility box that is used for the home's outlets and switches.

Traditional monitoring systems are often designed as standalone units that protrude from the surface they are mounted on. While functional, these protruding designs can be visually obtrusive and may not align well with interior design aesthetics.

SUMMARY

The examples herein enable systems and methods for incorporating detectors (for example, smoke detectors, carbon monoxide detectors, among others) with lighting assemblies, such as recessed lighting fixtures, in an aesthetically pleasing way.

According to one example, an apparatus is provided that includes a light fixture including a housing; a face plate coupled to the light fixture; and a detector coupled to the housing at a location behind a back surface of the face plate. In an example, the light fixture is a recessed light fixture configured to fit within a recess of a ceiling, and the face plate is configured to be displaced from a surface of the ceiling by a gap distance. In the same or different examples, the face plate may be detachable from the housing. In the same or different examples, the face plate may be depressible, and the detector is configured to perform a detector test in response to a depression of the face plate. In the same or different examples, the light fixture further includes a light element located within the housing, and the housing includes an insulated wall located between the light element and the detector. In the same or different examples, the light fixture further includes a light element located within the housing and configured to dissipate as heat less than 15 watts of power. In the same or different examples, the detector comprises at least one of a smoke detector and a carbon monoxide detector. In the same or different examples, the light fixture further includes a light element located within the housing, and the detector is configured to control the light element in response to detecting a hazard. In the same or different examples, the apparatus further includes a wiring assembly, which includes a first power line configured to provide power to the light fixture, a second power line configured to provide power to the detector, and an interconnect line. In the same or different examples, the apparatus further includes a wiring assembly, which includes an interconnect line and a power line configured to provide power to the light fixture and the detector. In the same or different examples, the light fixture further includes a switch configured to control power to the light fixture in response to a control signal. In the same or different examples, the apparatus may further comprise a battery configured to provide power to the detector in an absence of power from the power line.

According to another example, a system is provided that includes a light fixture configured to fit in a recess of a ceiling, the light fixture having a housing and a light element located within the housing; the system further including a face plate coupled to the light fixture and configured to be displaced from a surface of the ceiling by a gap distance, and a detector coupled to the housing at a location behind a back surface of the face plate. In an example, the light fixture further comprises a ventilation gap between the light element and an interior sidewall of the housing; and the housing includes one or more ventilation holes in an upper surface of the housing. In the same or different examples, the housing includes an insulated wall located between the light element and the detector. In the same or different examples, the detector comprises at least one of a smoke detector and a carbon monoxide detector. In the same or different examples, the detector is configured to control the light element in response to detecting a hazard.

Another example provides a method which may include receiving power from a power source at a lighting assembly including a light fixture and a detector; controlling a light element of the light fixture in response to a control signal; detecting a hazard with the detector; and outputting an alarm in response to detecting the hazard. In the same or different examples, the method may further include controlling the light element in response to detecting the hazard with the detector. In the same or different examples, detecting a hazard may comprise detecting a presence of at least one of carbon monoxide and smoke.

BRIEF DESCRIPTION OF THE DRAWINGS

A more complete understanding of the present embodiments may be acquired by referring to the following description taken in conjunction with the accompanying drawings, in which like reference numbers indicate like features.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

The following description sets forth example aspects of the present disclosure. Such description is not intended as a limitation on the scope of the present disclosure. Rather, the description also encompasses combinations and modifications to those example aspects described herein.

The inventors of embodiments of the present disclosure have recognized the benefit of monitoring systems that can seamlessly integrate into living spaces without compromising safety, functionality, or aesthetics. This disclosure presents a monitoring system, for example, a smoke detector, which may be included with a lighting assembly such as a recessed lighting fixture. By incorporating the monitoring system with a recessed lighting fixture for example, the monitoring system may be hidden from view such that it does not appear as an unsightly protrusion. Incorporating the monitoring system with a recessed lighting fixture, for example, simplifies installation of the monitoring system, and allows for the improvement of aesthetics through the reduction of visual pollution.

Figure 1:
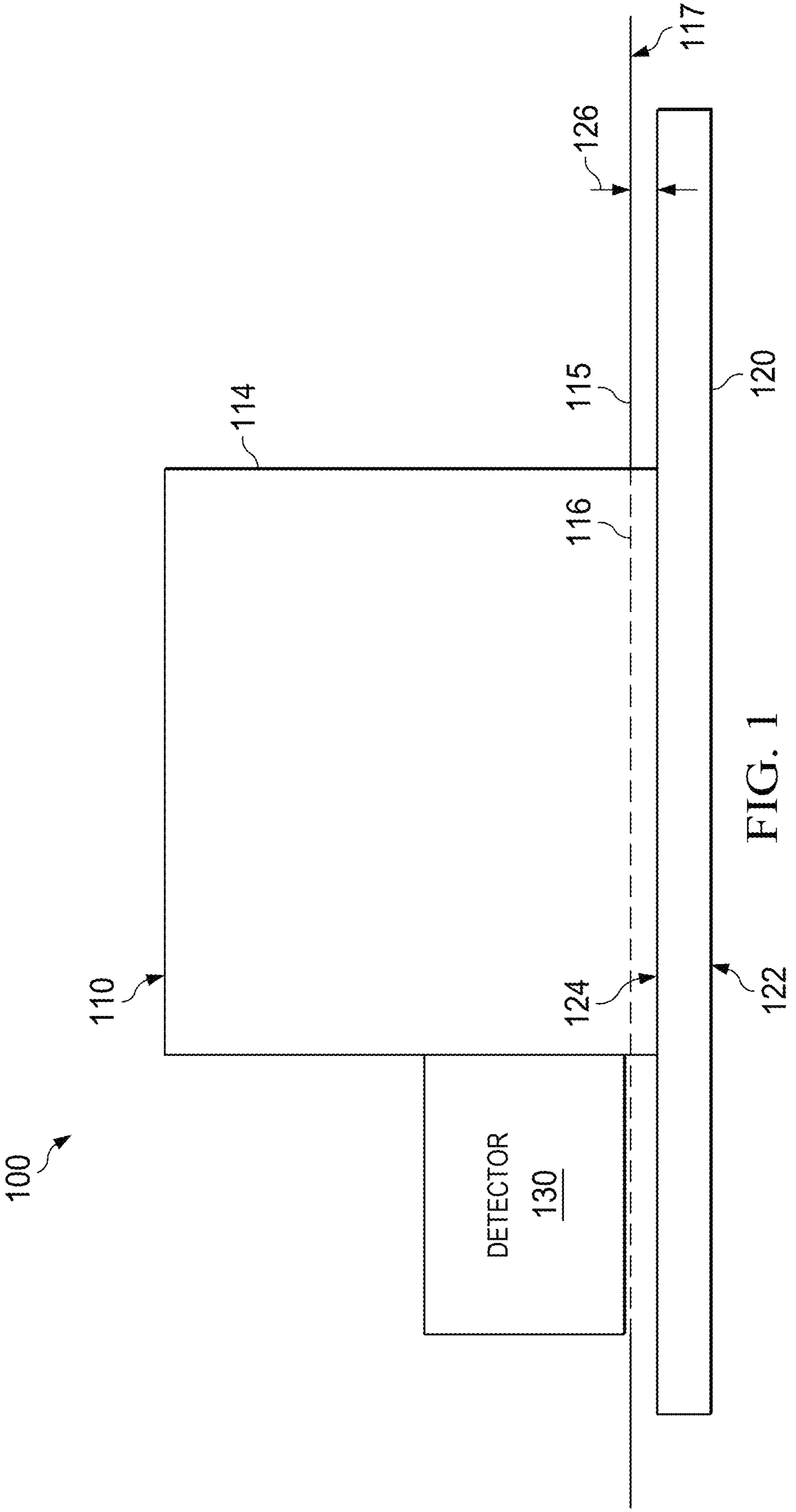
FIG. 1 illustrates a side view of an apparatus incorporating a detector together with a recessed light fixture in accordance with embodiments of the present disclosure.

FIG. 1 illustrates a side view of apparatus 100 incorporating a detector together with a recessed light fixture in accordance with embodiments of the present disclosure. In some embodiments, apparatus 100 may be implemented as a light assembly including a recessed light fixture and a detector. For example, apparatus 100 may include light fixture 110, face plate 120, and detector 130.

Light fixture 110 may be a recessed light fixture configured to fit within a recess of a ceiling. For example, light fixture 110 may include housing 114, which may be configured to fit within recess 116 of ceiling 115. Face plate 120 may be coupled to light fixture 110. For example, face plate 120 may be coupled to housing 114 of light fixture 110. Face plate 120 may have a front surface 122 configured to face downward to the space that is to be illuminated by a light element that may be included within light fixture 110. Face plate 120 may also have aback surface 124 configured to face upward toward the surface 117 of ceiling 115. As shown in FIG. 1, face plate 120 may be configured to be displaced from a surface 117 of ceiling 115 by a gap distance 126. For example, face plate 120 may be coupled to light fixture 110, and in particular to housing 114, in a manner such that a gap distance 126 is provided between a back surface 124 of face plate 120 and the surface 117 of ceiling 115.

Detector 130 may be coupled to housing 114 of light fixture 110 at a location behind a back surface 124 of face plate 120. Detector 130 may include at least one of a smoke detector and a carbon monoxide detector. For example, detector 130 may include a smoke detector, may include a carbon monoxide detector, or may include both a smoke detector and a carbon monoxide detector. In addition, or in the alternative, detector 130 may be configured to detect other harmful gasses, including but not limited to, radon for example.

In the event of a hazard event such as a fire in the room below the lighting assembly that forms apparatus 100, smoke may rise through the air to the surface 117 of ceiling 115. Upon reaching ceiling 115, the smoke may travel along the surface 117 of ceiling 115 and into the gap distance 126 between the back surface 124 of face plate 120 and detector 130. The smoke may then pass through the recess 116 in ceiling 115 and be detected by detector 130. Detector 130 may thus detect the presence of smoke in the room below the lighting assembly. Detector 130 may, in addition or in the alternative, also detect other harmful gasses such as carbon monoxide or radon, among others, in a similar manner. In response to detecting a hazard, detector 130 may provide an alert. For example, detector 130 may provide an audible alert in response to detecting a hazard. In some embodiments, detector 130 may be configured to control a light element within light fixture 110 in response to detecting a hazard such as smoke or carbon monoxide. For example, detector 130 may control a light element within light fixture 110 to flash to indicate a hazard, such as a smoke event or the presence of carbon monoxide. Specifically, detector 130 may be configured to turn a light element within light fixture 110 on and off in a repeating manner to provide a visual alert in response to detecting a hazard, such as the presence of smoke or carbon monoxide or any other hazardous gas to be detected by detector 130.

Figure 2:
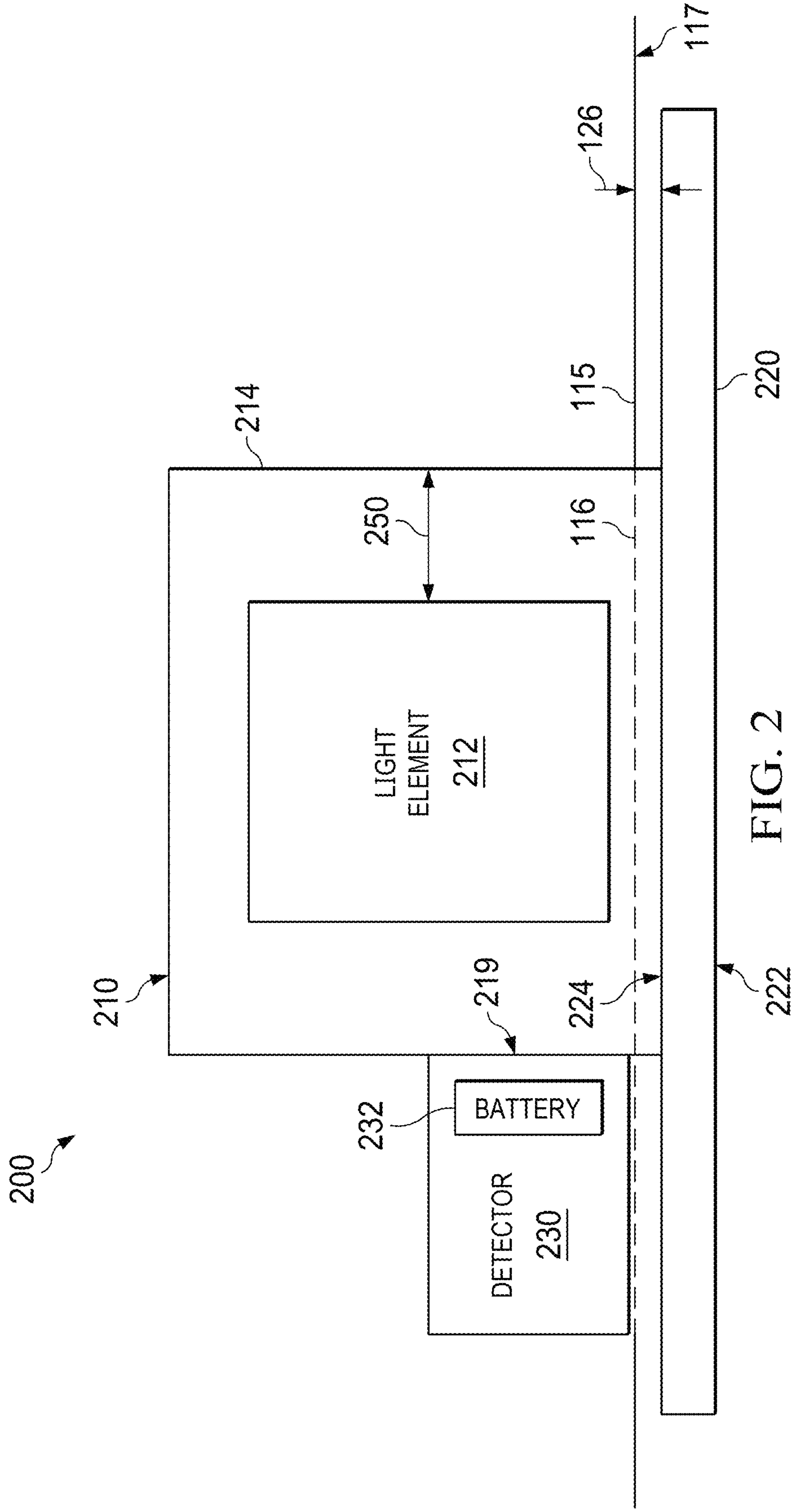
FIG. 2 illustrates a side view of an apparatus incorporating a detector together with a recessed light fixture in accordance with embodiments of the present disclosure.

FIG. 2 illustrates a side view of apparatus 200 incorporating a detector together with a recessed light fixture in accordance with embodiments of the present disclosure. In some embodiments, apparatus 200 may be implemented as a light assembly including a recessed light fixture and a detector. For example, apparatus 200 may include light fixture 210, face plate 220, and detector 230.

Light fixture 210 may be a recessed light fixture configured to fit within a recess 116 of a ceiling 115. Light fixture 210 may include light element 212 located within housing 214 of light fixture 210. In some embodiments, light element 212 may be permanently incorporated within light fixture 210. In other embodiments, light element 212 may be replaceable by another instance of light element 212. Light element 212 may be implemented by, or may include, any suitable light source, such as a light bulb or a light-emitting diode (LED). For example, light element 212 may include a light bulb or an LED within a further cannister or other casing configured to hold the light bulb or LED and to point emitted light downward past face plate 220 and into the space below light fixture 210. In some embodiments, light element 212 may point straight downward, perpendicular to the plane of the surface of ceiling 115. In other embodiments, light element 212 may be offset at an angle (such as 5 degrees, 10 degrees, or more) from an axis that is perpendicular to the plane of the surface of ceiling 115. In some embodiments, light element 212 may be configured to consume 15 watts or less of power during operation. Accordingly, light element 212 may be configured to dissipate as heat less than 15 watts of power during operation. The lower wattage consumed by light element 212, the lower the heat generated by light element 112 may be. As described in further detail below with reference to detector 230, reducing or dissipating the heat generated by light element 212 may prevent such heat from interfering with detector 230.

Face plate 220 may be coupled to light fixture 210. For example, face plate 220 may be coupled to housing 214 of light fixture 210. Face plate 220 may have a front surface 222 configured to face downward to space that is to be illuminated by light element 212. Face plate 220 may also have a back surface 224 configured to face upward toward the surface 117 of ceiling 115. As shown in FIG. 2, face plate 220 may be configured to be displaced from a surface 117 of ceiling 115 by a gap distance 126. For example, face plate 220 may be coupled to light fixture 210, and in particular to housing 214, in a manner such that a gap distance 126 is provided between a back surface 224 of face plate 220 and the surface 117 of ceiling 115.

In some embodiments, face plate 220 may be detachable from housing 214. In such embodiments, the lighting assembly including light fixture 210 and detector 230 may be inserted into or through a recess 116 in ceiling 115 during installation. Face plate 220 may then be attached to housing 214 to cover detector 230 from view from the room below.

Detector 230 may be coupled to housing 214 of light fixture 210 at a location behind a back surface 224 of face plate 220. Detector 230 may include at least one of a smoke detector and a carbon monoxide detector. For example, detector 230 may include a smoke detector, may include a carbon monoxide detector, or may include both a smoke detector and a carbon monoxide detector. In addition, or in the alternative, detector 230 may be configured to detect other harmful gasses, including but not limited to, radon for example.

In the event of a hazard event such as a fire in the room below the lighting assembly forming apparatus 200, smoke may rise through the air to the surface 117 of ceiling 115. Upon reaching ceiling 115, the smoke may travel along the surface 117 of ceiling 115 and into the gap distance 126 between the back surface 224 of face plate 220 and detector 230. The smoke may then pass through the recess 116 in ceiling 115 and be detected by detector 230. Detector 230 may thus detect the presence of smoke in the room below the lighting assembly. Detector 230 may, in addition or in the alternative, also detect other harmful gasses such as carbon monoxide or radon, among others, in a similar manner. In response to detecting a hazard, detector 230 may provide an alert. For example, detector 230 may provide an audible alert in response to detecting a hazard. In some embodiments, detector 230 may be configured to control light element 212 in response to detecting a hazard such as smoke or carbon monoxide. For example, detector 230 may control light element 212 to flash to indicate a hazard, such as a smoke event or the presence of carbon monoxide. Specifically, detector 230 may be configured to turn light element 212 on and off in a repeating manner to provide a visual alert in response to detecting a hazard, such as the presence of smoke or carbon monoxide or any other hazardous gas to be detected by detector 230.

In some embodiments, apparatus 200 may also include a battery configured to provide power to detector 230. In some embodiments, the battery may be incorporated with detector 230. For example, as shown in FIG. 2, detector 230 may include battery 232. In some embodiments, battery 232 may serve as a backup power supply and may supply power to detector 230 in the absence of power from a mains power line, for example in the event of a power outage. In other embodiments, battery 232 may be configured as the primary power source providing continuous power to detector 230. In such other embodiments, battery 232 may be a rechargeable battery that charges when AC power is provided to light fixture 210 or apparatus 200 as a whole.

In some embodiments, light fixture 210 may include various features to reduce or eliminate heat the transfer of heat from light element 212 to the area and air around detector 230. For example, housing 214 may include an insulated wall 219 located between light element 212 and detector 230. In some embodiments, the entirety of the side wall of housing 214 may be insulated. Further, light fixture 210 may include a ventilation gap 250 between light element 212 and an interior sidewall of housing 214 to allow for cooling of light element 212. Light fixture 210 may also include ventilation holes in housing 214. For example, housing 214 may include one or more ventilation holes in an upper surface of housing 214. Such ventilation holes in housing 114 may further provide for the dissipation of heat from light element 212 away from detector 230. By reducing or eliminating the transfer of heat from light element 212 to the area around detector 230, the apparatus may avoid or reduce a heat gradient around detector 230 that could otherwise push away smoke, carbon monoxide, or any other hazardous gas to be monitored by detector 230.

Figure 3:
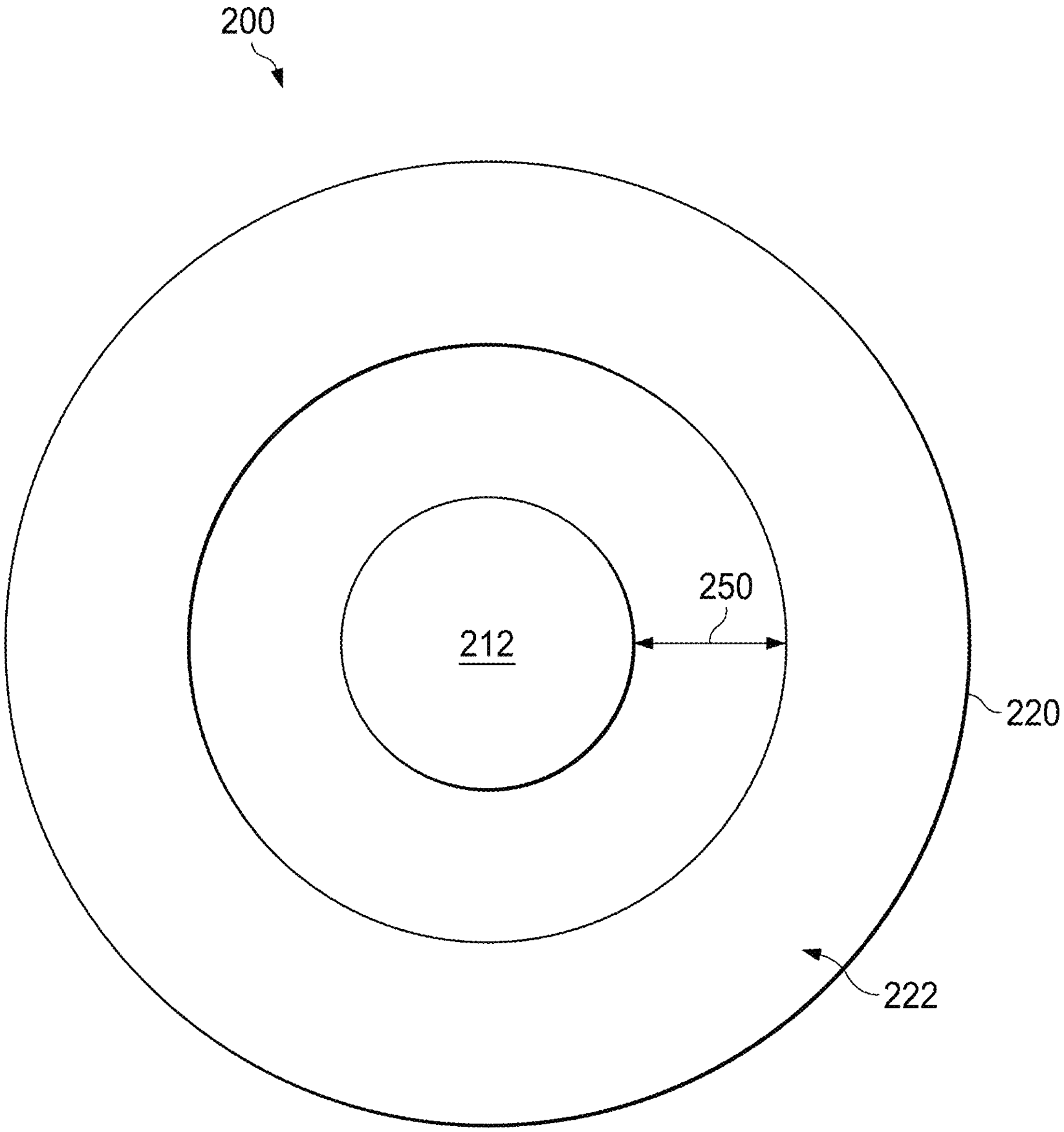
FIG. 3 illustrates a bottom view of an apparatus incorporating a detector together with a recessed light fixture in accordance with embodiments of the present disclosure.

FIG. 3 illustrates a bottom view of apparatus 200 incorporating a detector together with a recessed light fixture in accordance with embodiments of the present disclosure. Specifically, FIG. 3 illustrates a bottom view looking up at apparatus 200 from an area under apparatus 200 to be illuminated by light element 212. As described above with reference to FIG. 2, detector 230 may be located behind a back surface 224 of face plate 220. Accordingly, as shown in the bottom view of FIG. 3, the front surface 222 of face plate 220 may be visible while detector 230 may be hidden from view behind face plate 220.

Figure 4:
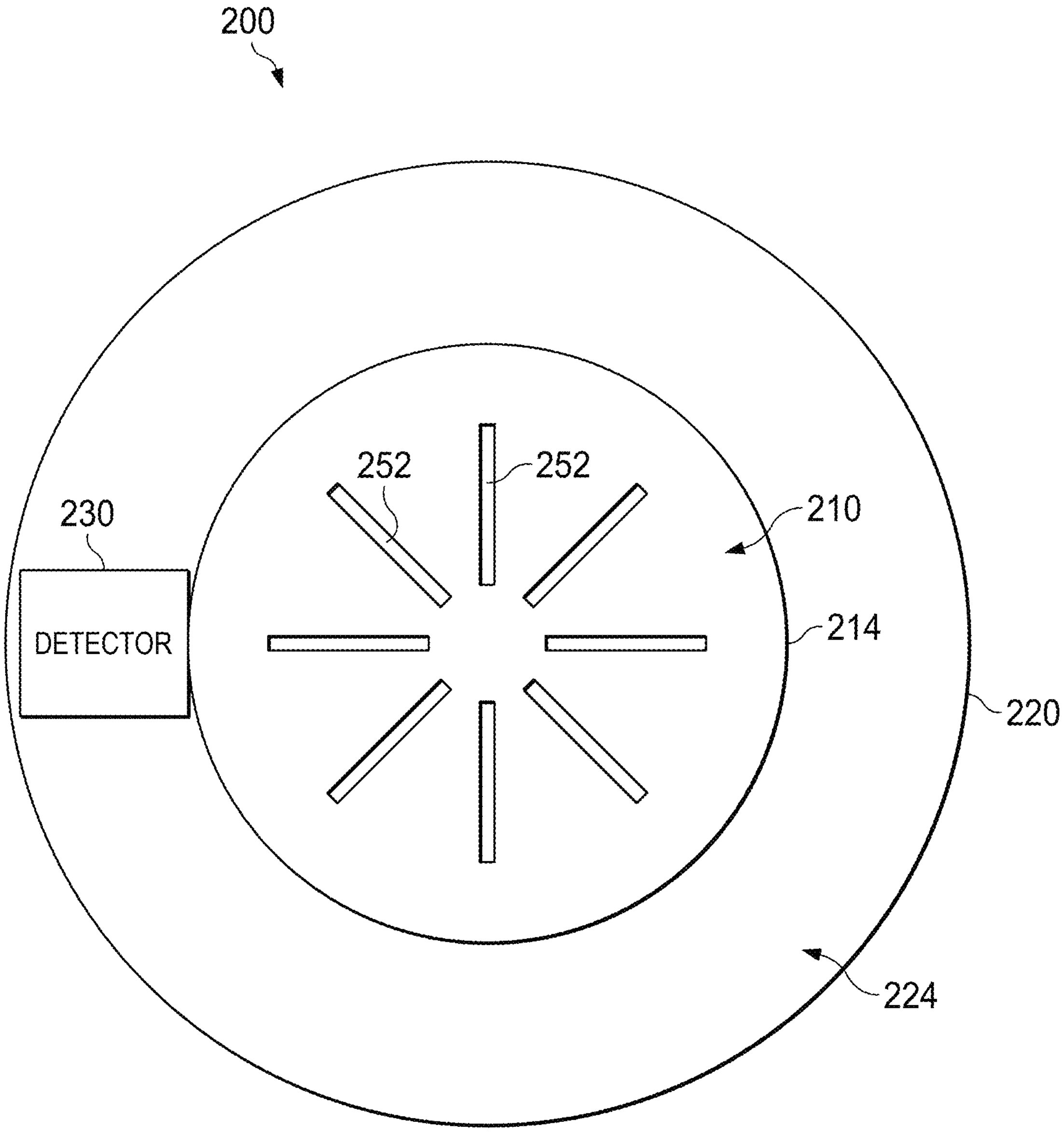
FIG. 4 illustrates a top view of an apparatus incorporating a detector together with a recessed light fixture in accordance with embodiments of the present disclosure.

FIG. 4 illustrates a top view of apparatus 200 incorporating a detector together with a recessed light fixture in accordance with embodiments of the present disclosure. Specifically, FIG. 4 illustrates a top view, for example looking down at apparatus 200 from a top view prior to installation in a recess of a ceiling. As shown in FIG. 4, light fixture 210 may include ventilation holes 252 located for example in an upper surface of the housing 214 of light fixture 210. Such ventilation holes 252 in housing 214 (shown in FIG. 4), together with ventilation gap 250 (shown in FIG. 2 and FIG. 3), may provide for the dissipation of heat from light element 212 away from detector 230. By venting light element 212, the heat around detector 230 may be reduced so as to prevent, or to reduce the extent to which smoke, carbon monoxide, or any other hazard gas, is repelled away from detector 230. Specifically, by reducing or eliminating the transfer of heat from light element 212 to the area around detector 230, the apparatus may avoid or reduce a heat gradient around detector 230 that could otherwise push away from detector 230 smoke, carbon monoxide, or any other hazardous gas to be monitored by detector 230.

As also shown in FIG. 4, detector 230 may be located behind the back surface 224 of face plate 220. Tucking detector 230 into recessed light may make detector 230 invisible in the room, but may still allow detector 230 to be connected to an interconnect line to support an all-room warning, as described in further detail below with reference to FIGS. 7 and 8. In some embodiments, push-to-test functions utilized by prior stand-alone ceiling-mounted detectors may be moved to a remote device controlling the light element 212 in apparatus 200. For example, a push-to-test function for a detector 230 may be implemented with a button on a remote control device or remote wall switch, or for example an application on a remote smart phone or tablet wirelessly coupled to apparatus 200. By placing detector 230 behind face plate 220, detector 230 may be provided to detect various hazards such as smoke or carbon monoxide, but without adding further visual obtrusive elements to the room environment. Incorporating detector 230 with light fixture 210 and behind face plate 220 allows for the improvement of aesthetics through the reduction of visual pollution.

Figure 5:
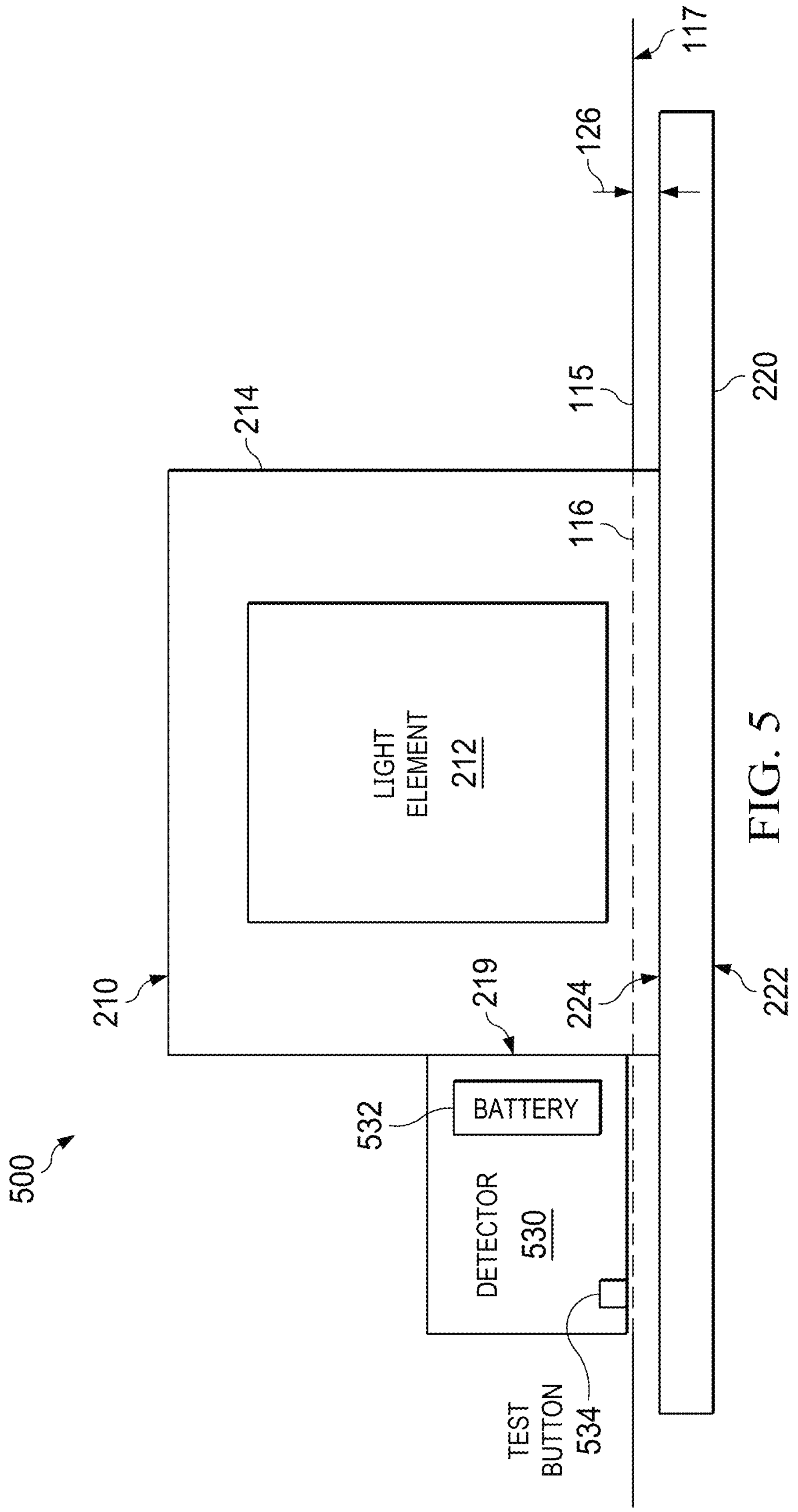
FIG. 5 illustrates a side view of an apparatus incorporating a detector together with a recessed light fixture in accordance with embodiments of the present disclosure.

FIG. 5 illustrates a side view of apparatus 500 incorporating a detector together with a recessed light fixture in accordance with embodiments of the present disclosure. In some embodiments, apparatus 500 may be implemented as a light assembly including a recessed light fixture and a detector. Apparatus 500 may include light fixture 210, light element 212, and face plate 220, which may be configured and may operate in a similar manner as described above with reference to apparatus 200 of FIG. 2.

As shown in FIG. 5, apparatus 500 may also include detector 530. Detector 530 may be coupled to housing 214 of light fixture 210 at a location behind a back surface 224 of face plate 220. Detector 530 may include at least one of a smoke detector and a carbon monoxide detector. For example, detector 530 may include a smoke detector, may include a carbon monoxide detector, or may include both a smoke detector and a carbon monoxide detector. In addition, or in the alternative, detector 530 may be configured to detect other harmful gasses, including but not limited to, radon for example.

As described above with reference to FIG. 2, face plate 220 may be detachable from housing 214. The lighting assembly including light fixture 210 and detector 530 may be inserted into or through a recess 116 in ceiling 115 during installation. Face plate 220 may then be attached to housing 214 to cover detector 530 from view from the room below. The detachable configuration of face plate 220 may also facilitate user access to detector 530 though covering detector 530 from view during normal operation. For example, as shown in FIG. 5, detector 530 may include battery 532. Battery 532 may be a back-up battery. For example, battery 532 may provide power to detector 530 in the event of a power outage in the house or building in which apparatus 500 is installed. By detaching face plate 220, a user may access detector 530 and replace an old or depleted battery with a new or freshly charged battery.

As also shown in FIG. 5, detector 530 may include test button 534. By detaching face plate 220, a user may access test button 534 after installation of the lighting assembly. Test button 534 may trigger a push-to-test function, which may test the sensor functionality of detector 230 as well as the alarm functionality. Test button 534 may also be utilized by a user to stop a hazard alert in the event of a false alarm, thereby silencing an audible alert, halting a visual alert, or both. In some embodiments, test button 534 may be flush with a bottom surface of detector 530 to prevent test button 534 from blocking the flow of smoke, carbon monoxide, or any other harmful gas to be detected by detector 530.

Figure 6:
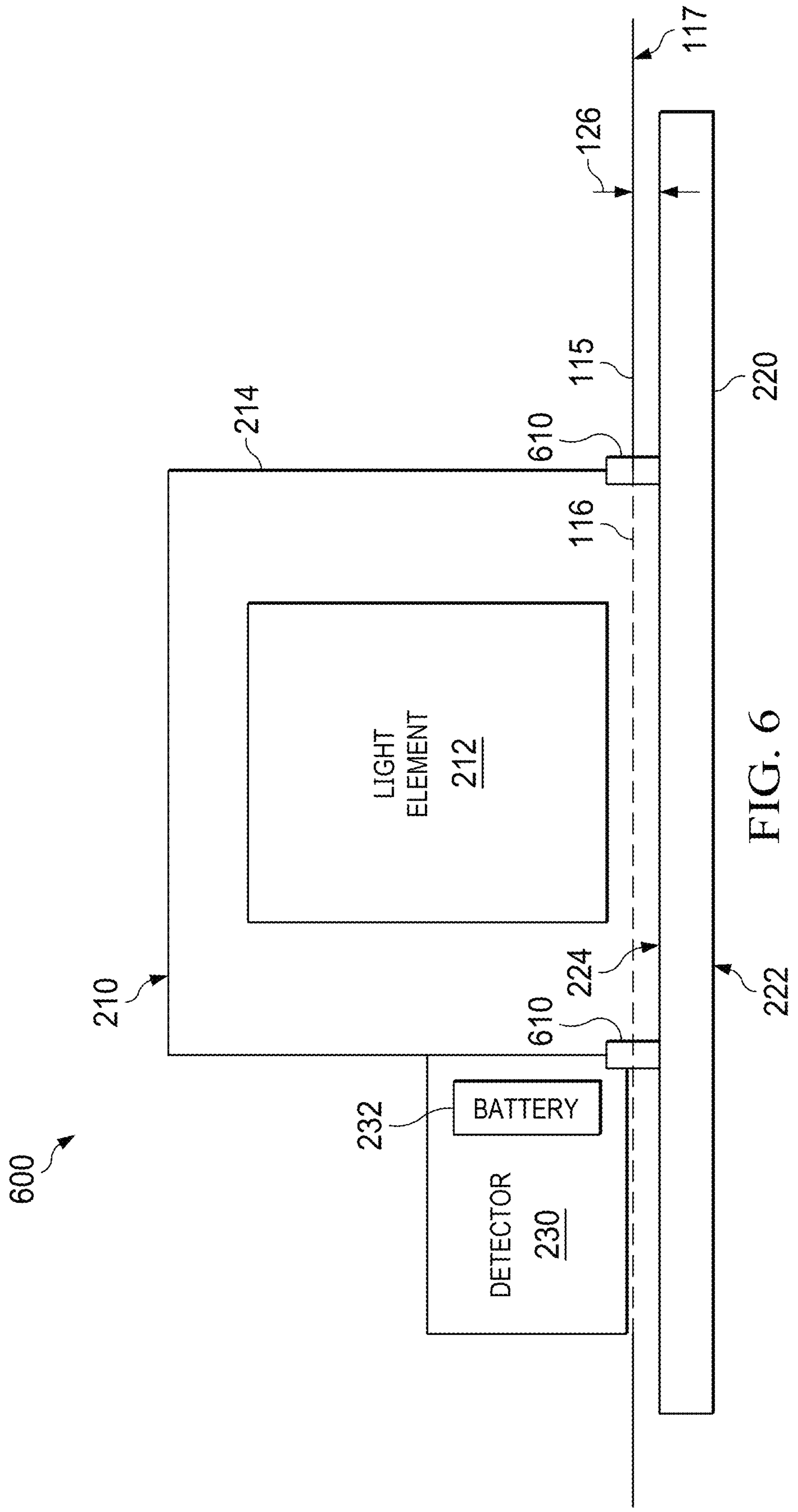
FIG. 6 illustrates a side view of an apparatus incorporating a detector together with a recessed light fixture in accordance with embodiments of the present disclosure.

FIG. 6 illustrates a side view of apparatus 600 incorporating a detector together with a recessed light fixture in accordance with embodiments of the present disclosure. In some embodiments, apparatus 600 may be implemented as a light assembly including a recessed light fixture and a detector. Apparatus 600 may include light fixture 210, light element 212, and face plate 220, which may be configured and may operate in a similar manner as described above with reference to apparatus 200 of FIG. 2.

As shown in FIG. 6, apparatus 600 may also include coupler 610. Coupler 610 may couple face plate 220 to housing 214 of light fixture 210. In some embodiments, coupler 610 may be a spring-loaded coupling between face plate 220 and housing 214 of light fixture 210. In such embodiments, face plate 220 may be depressible in an upward trajectory toward surface 117 of ceiling 115. Further, in some embodiments, detector 230 may be configured to detect a depression of face plate 220. Detector 230 may thus be configured to perform a detector test in response to a depression of face plate 220. For example, a depression of face plate 220 may trigger a push-to-test function, which may test the sensor functionality of detector 230 as well as the alarm functionality. A user may also depress face plate 220 to stop a hazard alert in the event of a false alarm, thereby silencing an audible alert, halting a visual alert, or both.

Figure 7:
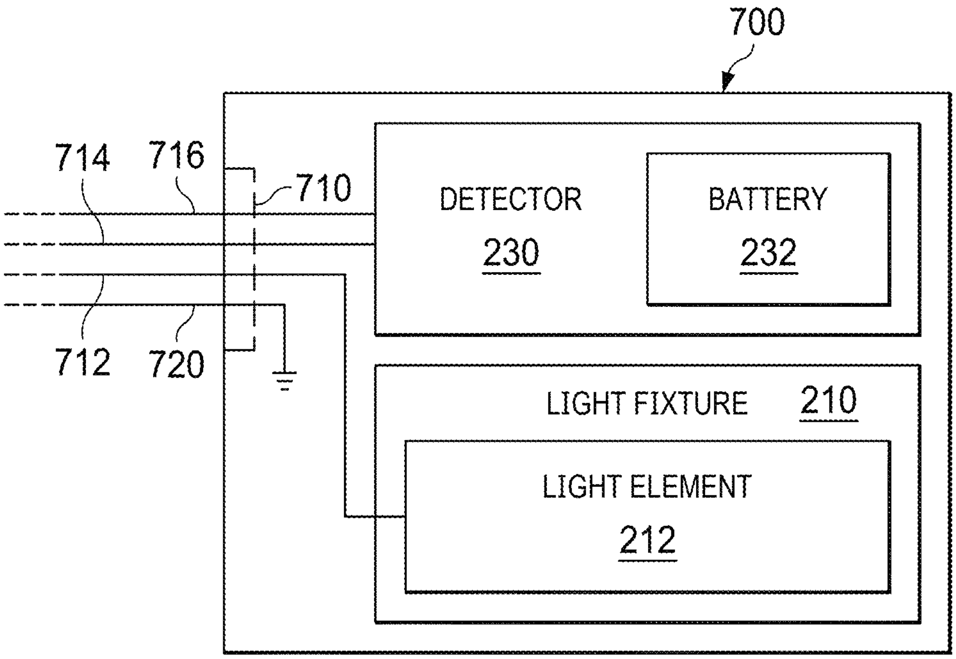
FIG. 7 illustrates a schematic wiring diagram of an apparatus incorporating a detector together with a recessed light fixture in accordance with embodiments of the present disclosure.

FIG. 7 illustrates a schematic wiring diagram of apparatus 700 incorporating a detector together with a recessed light fixture in accordance with embodiments of the present disclosure. Apparatus 700 may represent an embodiment, for example, of any of apparatus 100, apparatus 200, apparatus 500, apparatus 600, and may further illustrate electrical wiring contained therein.

As shown in FIG. 7, apparatus 700 may include wiring assembly 710. Wiring assembly 710 may include a first power line 712 configured to provide power to light fixture 210. Wiring assembly 710 may also include a second power line 714 configured to provide power to detector 230. In such embodiments, the separate power lines to light fixture 210 and detector 230 may allow detector 230 to be powered continuously regardless of whether power for light fixture 210 is switched on or off by a user, for example by a user-controlled switch external to apparatus 700. As shown in FIG. 7, detector 230 may include battery 232. In some embodiments, battery 232 may serve as a backup power supply and may supply power to detector 230 in the absence of power from the second power line 714, for example in the event of a power outage.

As shown in FIG. 7, wiring assembly 710 may also include ground line 720. Ground line 720 may provide an electrical return for an external power source that ultimately supplies the power for one or both of the first power line 712 and the second power line 714. Although a single ground line 720 is shown in FIG. 7, in some embodiments, wiring assembly 710 may include multiple ground lines. For example, in some embodiments, wiring assembly may include a first ground line corresponding to the first power line 712, and may further include a second ground line corresponding to the second power line 714.

In addition, wiring assembly 710 may include an interconnect line 716. The interconnect line 716 may be used to couple to a house-wide or building-wide interconnect line that multiple detectors, such as multiple instances of detector 230 or other detectors, may use to connect and communicate with each other. In the event that a smoke event or other hazard is detected by one detector, that detector may communicate the hazard to the other detectors via the interconnect line. Each detector may then produce an alert, such as audible alert, a visual alert, or both, and may thus collectively provide an all-room warning to one or more occupants of the home or building.

The various electrical lines running from wiring assembly 710 may be included, for example, in one or more ROMEX cables. For example, the first power line 712, the second power line 714, and the ground line 720 may be routed together in an insulated ROMEX cable or other multi-wire cable sufficient to connect to a home or buildings power source either directly or indirectly. In addition, the interconnect line 716 may be routed via the same or different ROMEX cable or other cable sufficient to connect to other detectors in the same home or building as detector 230.

Figure 8:
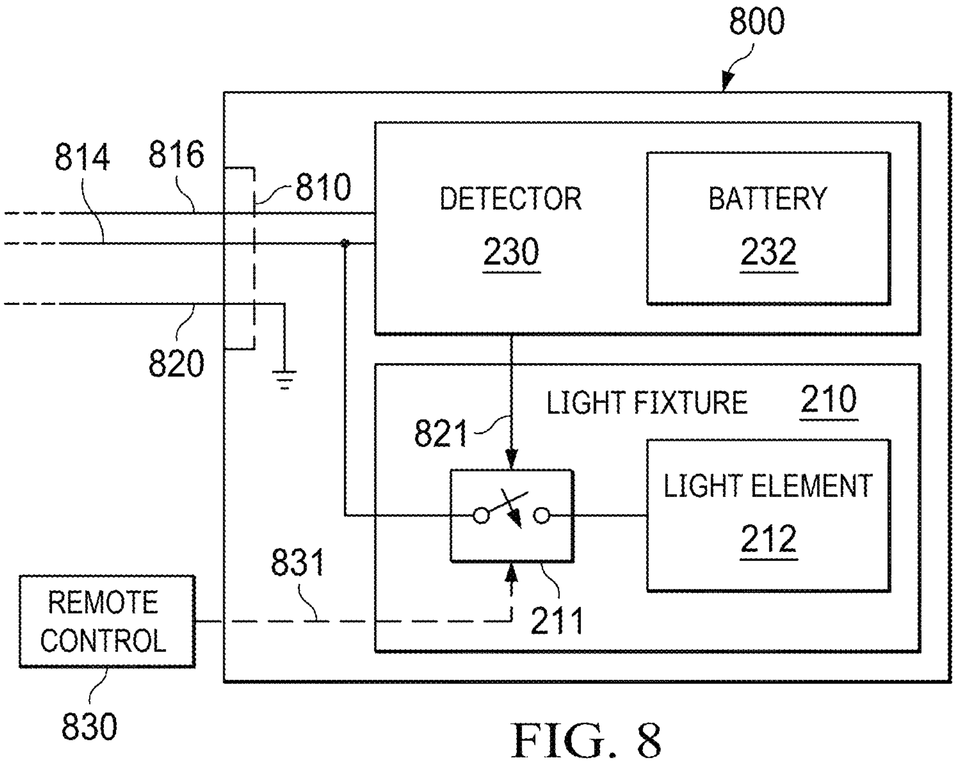
FIG. 8 illustrates a schematic wiring diagram of an apparatus incorporating a detector together with a recessed light fixture in accordance with embodiments of the present disclosure.

FIG. 8 illustrates a schematic wiring diagram of apparatus 800 incorporating a detector together with a recessed light fixture in accordance with embodiments of the present disclosure. Apparatus 800 may represent an embodiment, for example, of any of apparatus 100, apparatus 200, apparatus 500, apparatus 600, and may further illustrate electrical wiring contained therein.

In some embodiments, light fixture 210 and detector 230 may be purpose built to receive power off of one power line and to further use an additional lead for an interconnect line. As shown in FIG. 8 for example, wiring assembly 810 may include a power line 814 coupled to provide power to light element 212 and detector 230. Wiring assembly 810 may also include a ground line 820, which may provide an electrical return for an external power source that ultimately supplies the power for the power line 814 and the electrical elements (such as detector 230 and light fixture 210) coupled thereto. As also shown in FIG. 8, detector 230 may include battery 232. In some embodiments, battery 232 may serve as a backup power supply and may supply power to detector 230 in the absence of power from the power line 814, for example in the event of a power outage.

Light fixture 210 may include a switch 211 configured to control power to light fixture 210 in response to a control signal. For example, light fixture may include switch 211, which may control delivery of power to light element 112 in response to a control signal 831 from a remote control 830. Detector 230 may be powered continuously while light element 212 may be turned on and off according to the control signal 831, which may be received through either a wired connection or a wireless radio frequency (RF) connection from a remote control 830 that may be controlled by a user for example. In some embodiments, where apparatus 800 is included with a bank of recess lights, other lights in the bank of recess lights may be controlled by a switch such as a wall switch. In such embodiments, switch 211 may receive control signal 831 (which may be for example a wireless RF control signal) responsive to an external switch (for example an external wall switch) that a user may use to turn on and off the other lights in the bank of recess lights. Thus, light element 212 may be turned on and off in synchronization with other lights in the bank of recess lights, while detector 230 remains powered via the power line 814.

Switch 211 may be further configured to receive an additional control signal 821 from detector 230. For example, as described above with reference to FIG. 2, detector 230 may be configured to turn light element 212 on and off in a repeating manner to provide a visual alert in response to detecting a hazard, such as the presence of smoke or carbon monoxide or any other hazardous gas to be detected by detector 230. In such embodiments, detector 230 may send a control signal 821 to switch 211, which may turn light element 212 on and off in response to the control signal 821.

Wiring assembly 810 may also include an interconnect line 816. The interconnect line 816 may be used to couple to a house-wide or building-wide interconnect line that multiple detectors, such as multiple instances of detector 230 or other detectors, may use to connect and communicate with each other. In the event that a smoke event or other hazard is detected by one detector, that detector may communicate the hazard to the other detectors via the interconnect line. Each detector may then produce an alert, such as audible alert, a visual alert, or both, and may thus collectively provide an all-room warning to one or more occupants of the home or building.

The various electrical lines running from wiring assembly 810 may be included, for example, in one or more ROMEX cables. For example, the power line 814 and the ground line 820 may be routed together in an insulated ROMEX cable or other multi-wire cable sufficient to connect to a home or buildings power source either directly or indirectly. In addition, the interconnect line 816 may be routed via the same or different ROMEX cable or other cable sufficient to connect to other detectors in the same home or building as detector 230.

Figure 9:
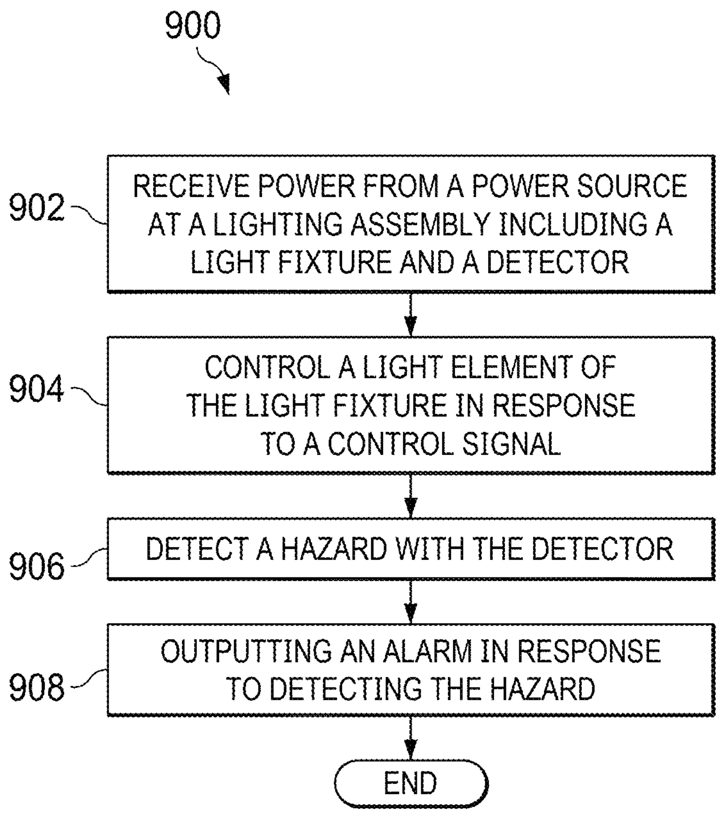
FIG. 9 illustrates a flow chart of an example method for operating a lighting assembly including a light fixture and a detector in accordance with embodiments of the present disclosure.

FIG. 9 illustrates a flow chart of an example method 900 for operating a lighting assembly including a light fixture and a detector in accordance with embodiments of the present disclosure. According to one example, method 900 may begin at block 902. Teachings of the present disclosure may be implemented in a variety of configurations of apparatus 100, apparatus 200, apparatus 500, apparatus 600, apparatus 700, and apparatus 800. As such, the initialization point for method 900 and the order of 902-908 comprising method 900 may depend on the implementation chosen.

At block 902, power may be received from a power source at a lighting assembly including a light fixture and a detector. At block 904, a light element of the light fixture may be controlled in response to a control signal. At block 906, a hazard may be detected by the detector. In some embodiments, detecting the hazard may comprise detecting the presence of at least one of carbon monoxide and smoke. At block 908, an alarm may be output in response to detecting the hazard.

Although FIG. 9 discloses a particular number of operations related to method 900, method 900 may be executed with greater or fewer operations than those depicted in FIG. 9. For example, after block 908, method 900 may continue with additional operations illustrated in FIG. 10. In addition, although FIG. 9 discloses a certain order of operations to be taken with respect to method 900, the operations comprising method 900 may be completed in any suitable order.

Figure 10:
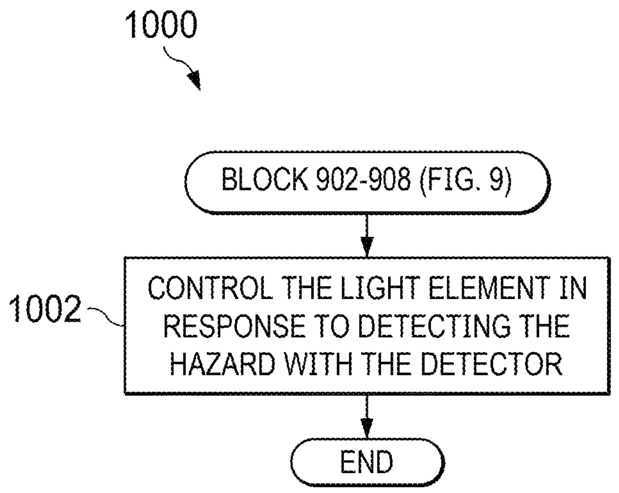
FIG. 10 illustrates a flow chart of an example method for operating a lighting assembly including a light fixture and a detector in accordance with embodiments of the present disclosure.

FIG. 10 illustrates a flow chart of an example method 1000 for operating a lighting assembly including a light fixture and a detector in accordance with embodiments of the present disclosure. According to one example, method 1000 may begin at block 1002. Teachings of the present disclosure may be implemented in a variety of configurations of apparatus 100, apparatus 200, apparatus 500, apparatus 600, apparatus 700, and apparatus 800. As such, the initialization point for method 1000 may depend on the implementation chosen.

Method 1000 may begin with blocks 902-908 (FIG. 9) and then proceed to block 1002. At block 1002, the light element may be controlled in response to detecting the hazard with the detector.

Although FIG. 10 discloses a particular number of operations related to method 1000, method 1000 may be executed with greater or fewer operations than those depicted in FIG. 10. In addition, although FIG. 10 discloses a certain order of operations to be taken with respect to method 1000, the operations comprising method 1000 may be completed in any suitable order. For example, block 1002 may be executed any time after block 906.

Methods 900 and 1000 may be implemented using, for example, apparatus 100, apparatus 200, apparatus 500, apparatus 600, apparatus 700, and apparatus 800, or any other system operable to implement methods 900 or 1000.

Although examples have been described above, other variations and examples may be made from this disclosure without departing from the spirit and scope of these disclosed examples.

The invention claimed is:

1. An apparatus, comprising:
- a light fixture including a housing and configured to fit within a recess of a ceiling;
- a face plate coupled to the light fixture and configured outside of the recess to be displaced from a surface of the ceiling by a gap distance; and
- a detector coupled to the housing at a location outside of the housing and behind a back surface of the face plate.

2. The apparatus of claim 1, wherein the face plate is detachable from the housing.

3. The apparatus of claim 1, wherein:
- the face plate is depressible; and
- the detector is configured to perform a detector test in response to a depression of the face plate.

4. The apparatus of claim 1, wherein:
- the light fixture further includes a light element located within the housing; and
- the housing includes an insulated wall located between the light element and the detector.

5. The apparatus of claim 1, wherein the light fixture further includes a light element located within the housing and configured to dissipate less than 15 watts of power as heat.

6. The apparatus of claim 1, wherein the detector comprises at least one of a smoke detector and a carbon monoxide detector.

7. The apparatus of claim 1, wherein:
- the light fixture further includes a light element located within the housing; and
- the detector is configured to control the light element in response to detecting a hazard.

8. The apparatus of claim 1, further comprising a wiring assembly including:
- a first power line configured to provide power to the light fixture;
- a second power line configured to provide power to the detector; and
- an interconnect line.

9. The apparatus of claim 1, further comprising a wiring assembly including:
- a power line configured to provide power to the light fixture and the detector; and
- an interconnect line.

10. The apparatus of claim 9, wherein the light fixture further includes a switch configured to control power to a light element in response to a control signal.

11. The apparatus of claim 9, further comprising a battery configured to provide power to the detector in an absence of power from the power line.

12. The apparatus of claim 1, wherein the face plate is opaque and configured to block the detector from view from outside of the recess.

13. A system comprising:
- a light fixture configured to fit in a recess of a ceiling, the light fixture including:
  - a housing;
  - a light element located within the housing; and
- a face plate coupled to the light fixture and configured outside of the recess to be displaced from a surface of the ceiling by a gap distance; and
- a detector coupled to the housing at a location outside of the housing and behind a back surface of the face plate.

14. The system of claim 13, wherein:
- the light fixture further comprises a ventilation gap between the light element and an interior sidewall of the housing; and
- the housing includes one or more ventilation holes in an upper surface of the housing.

15. The system of claim 13, wherein the housing includes an insulated wall located between the light element and the detector.

16. The system of claim 13, wherein the detector comprises at least one of a smoke detector and a carbon monoxide detector.

17. The system of claim 13, wherein the detector is configured to control the light element in response to detecting a hazard.

18. The system of claim 13, wherein the face plate is opaque and configured to block the detector from view from outside of the recess.

19. A method comprising:
- receiving power from a power source at a lighting assembly that includes a light fixture located in a recess of a ceiling and a detector coupled to a housing of the light fixture on the outside of the housing;
- controlling a light element of the light fixture in response to a control signal;
- blocking the detector from view from outside of the recess with a face plate coupled to the light fixture at a gap distance from a surface of the ceiling;
- detecting, with the detector, a presence of at least one of carbon monoxide and smoke located in the gap distance between a back surface of the face plate and the surface of the ceiling; and
- outputting an alarm in response to detecting the presence of the at least one of carbon monoxide and smoke.

20. The method of claim 19, further comprising controlling the light element in response to detecting the presence of the at least one of carbon monoxide and smoke with the detector.

* * * * *